Sept. 23, 1941.     T. BROWN ET AL     2,256,890
TRACTOR ENCLOSURE
Filed Feb. 23, 1940     3 Sheets-Sheet 2

INVENTOR:
THEOPHILUS BROWN
TALBERT W. PAUL
BY
ATTORNEYS.

Sept. 23, 1941.                T. BROWN ET AL                 2,256,890
                              TRACTOR ENCLOSURE
                             Filed Feb. 23, 1940           3 Sheets-Sheet 3
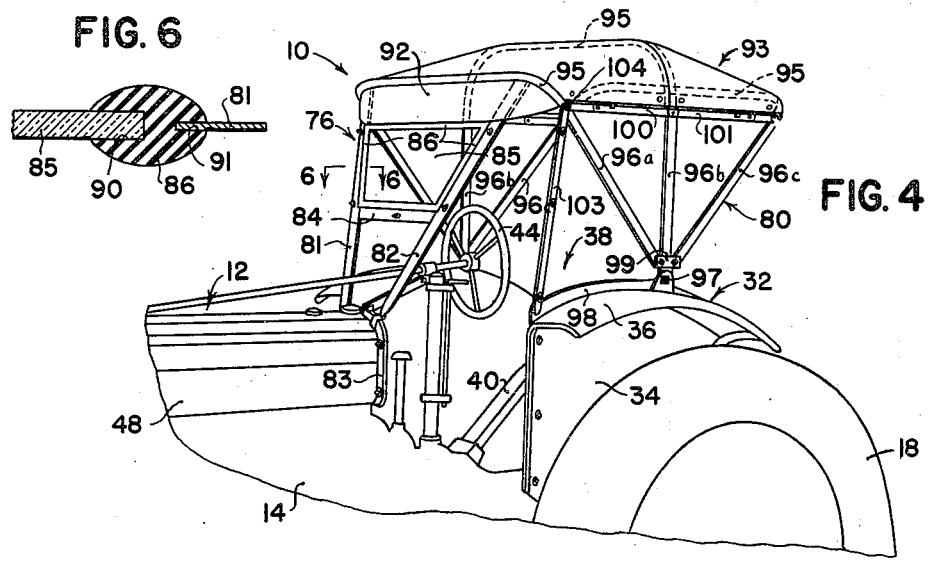
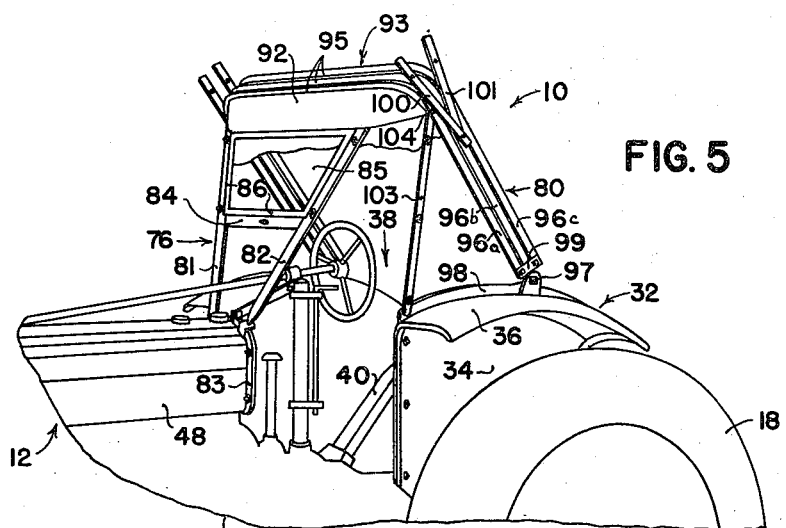
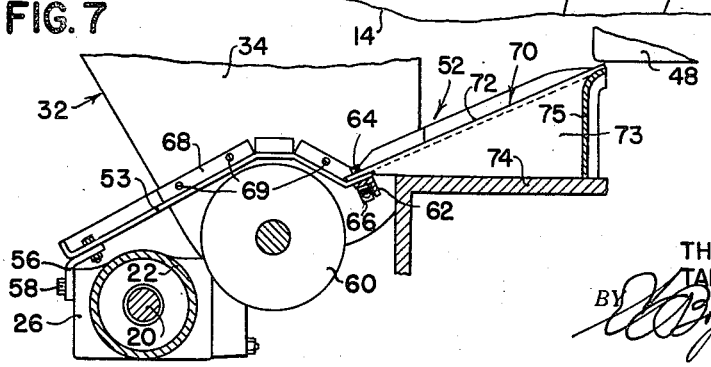
INVENTOR:
THEOPHILUS BROWN
TALBERT W. PAUL
BY
ATTORNEYS.

Patented Sept. 23, 1941

2,256,890

UNITED STATES PATENT OFFICE 2,256,890

TRACTOR ENCLOSURE

Theophilus Brown and Talbert W. Paul, Moline, Ill., assignors to Deere & Company, Moline, Ill., a corporation of Illinois Application February 23, 1940, Serial No. 320,300

2 Claims. (Cl. 296—111)

The present invention relates to farm tractors, and is more particularly concerned with demountable cabs of the type adapted to be mounted on a tractor to provide shelter for the operator from the weather. Heretofore, the tractor operator has had to depend upon umbrellas or folding tops, such as were commonly used on buggies, for protection from the hot sun or from cold winds and rain, and as a consequence much suffering and discomfort was experienced when it became necessary to work in the fields during periods of inclement weather. Integral cabs have been built onto certain makes of tractors, but these are expensive and the extreme protection that they afford is rarely needed since severe freezing or heavy rains generally render the field unfit for working. Furthermore, such cabs can be mounted only on specially designed tractors, and therefore are not applicable to other makes or models of tractors. The principal object of the present invention, therefore, is to provide a new and improved cab of the type adapted to be mounted on an open tractor and having a high degree of visibility in all directions. Another object is to provide a cab that is ruggedly constructed to withstand the jarring and jolting experienced while traveling over rough ground, and adjustable to meet the wide variety of conditions under which an agricultural tractor must work.

Another object of the present invention is to provide a folding top that can be folded forwardly to allow the operator to stand erect while driving over the field while, at the same time, affording complete visibility in all directions, particularly of the rows directly below and ahead of the tractor. Other folding tops known in the art fold forwardly to lie on top of the fuel tank when not needed, but one of the objections to such an arrangement is that the operator's view of the rows is partially obstructed, which is a distinct disadvantage when planting or cultivating row crops. The present invention, on the other hand, is so constructed and arranged that the top, when folded forwardly, is held up well out of the line of vision of the operator whether he is sitting or standing.

A further object of our invention is to provide a windshield that is rigidly fixed to the tractor and connected with the top to brace the latter against oscillation both longitudinally and laterally with respect to the tractor.

Still another object of our invention is to provide new and improved means for attaching the windshield glass to the windshield frame.

These and other objects and advantages of our invention will become apparent after the following detailed description of the preferred embodiment thereof, reference being had to the accompanying drawings, in which Figure 1 is a perspective side view of a tractor having a cab mounted thereon constructed according to the principles of our invention;

Figure 4 is a fragmentary perspective side view of the tractor and cab with the side curtains removed;

Figure 5 is a view similar to Figure 4 but with the top folded forwardly;

Figure 6 is an enlarged sectional view through the rubber bead holding the windshield in place, and is taken substantially along the line 6—6 of Figure 4; and Figure 7 is an enlarged sectional view taken substantially along the line 7—7 in Figure 3 and showing details of the floor boards and means for attaching the same to the tractor body.

Figure 1:
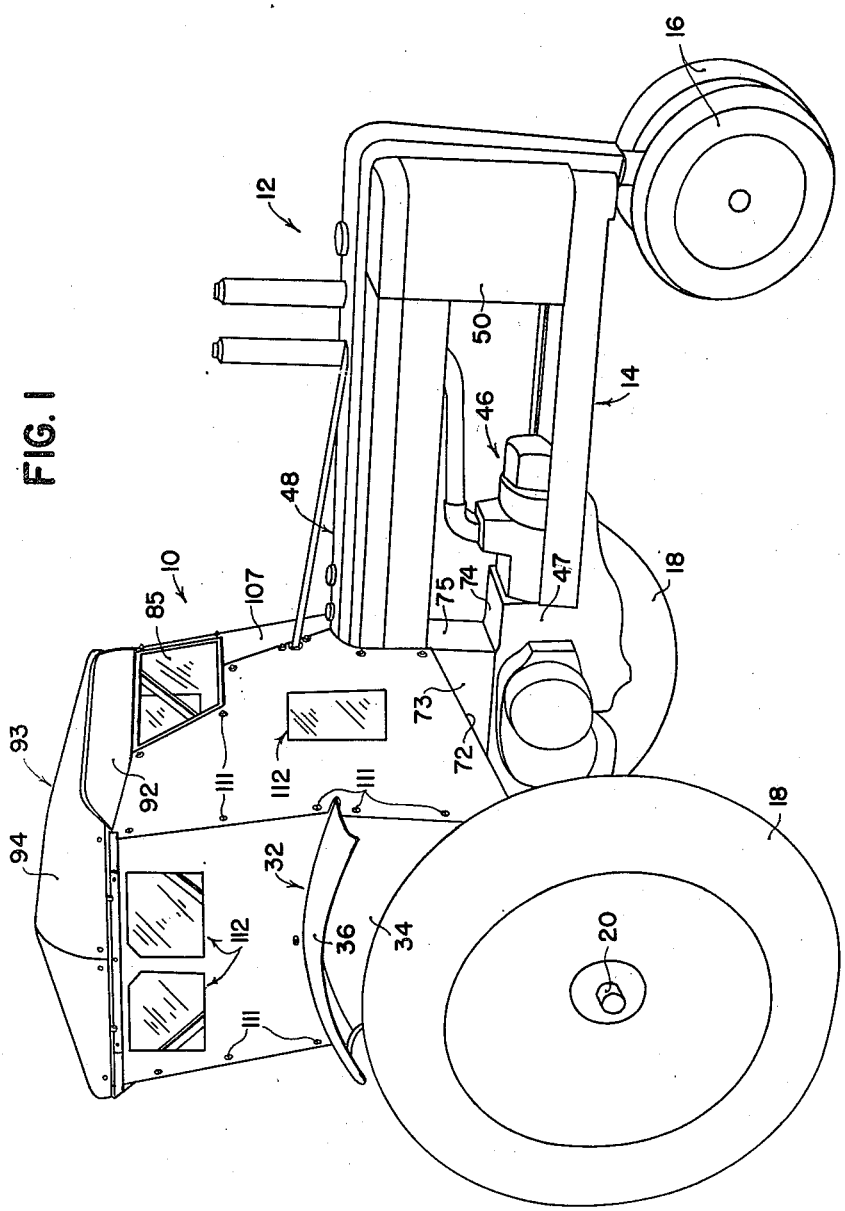

Referring now to the drawings, the cab is indicated in its entirety by the reference numeral 10, and is mounted on a farm tractor 12 having a longitudinally extending body 14 supported at its front end on dirigible wheels 16 and at its rear end on laterally spaced driving wheels 18. The wheels 18 are mounted on transverse axle shafts 20 which are journaled in axle housings 22 extending laterally from opposite sides of the differential-transmission housing 24. Rearwardly facing implement mounting bosses 26 and 28 are formed on the axle housings 22 and these are provided with threaded holes 30 which are adapted to receive suitable bolts for securing implements to the tractor body. Mounted on the outer end of each of the axle housings 22 in any suitable manner is a fender 32 having a vertical side 34 and a crown 36 extending outwardly over the wheel 18.

The operator's station is indicated generally by the reference numeral 38 and consists of a seat (not shown) bolted to a seat post 40 which is spring mounted on the tractor body in a well known manner to provide a resilient support. A horizontal platform 42 is provided on the transmission housing 24 upon which the operator may stand, if desired, while driving the tractor. The steering wheel 44 and other controls of the tractor are disposed within easy reach of the operator at his station.

The forwardly extending frame 14 constitutes an engine housing in which the engine 46 is carried. The engine 46 in the present embodiment is of the two-cylinder horizontal type and has a crank case 47 which communicates with the differential-transmission housing 24. Disposed above the engine 46 and ahead of the operator's station 38 is a fuel tank 48, the front end of which is supported on the radiator shell 50.

Figure 3:
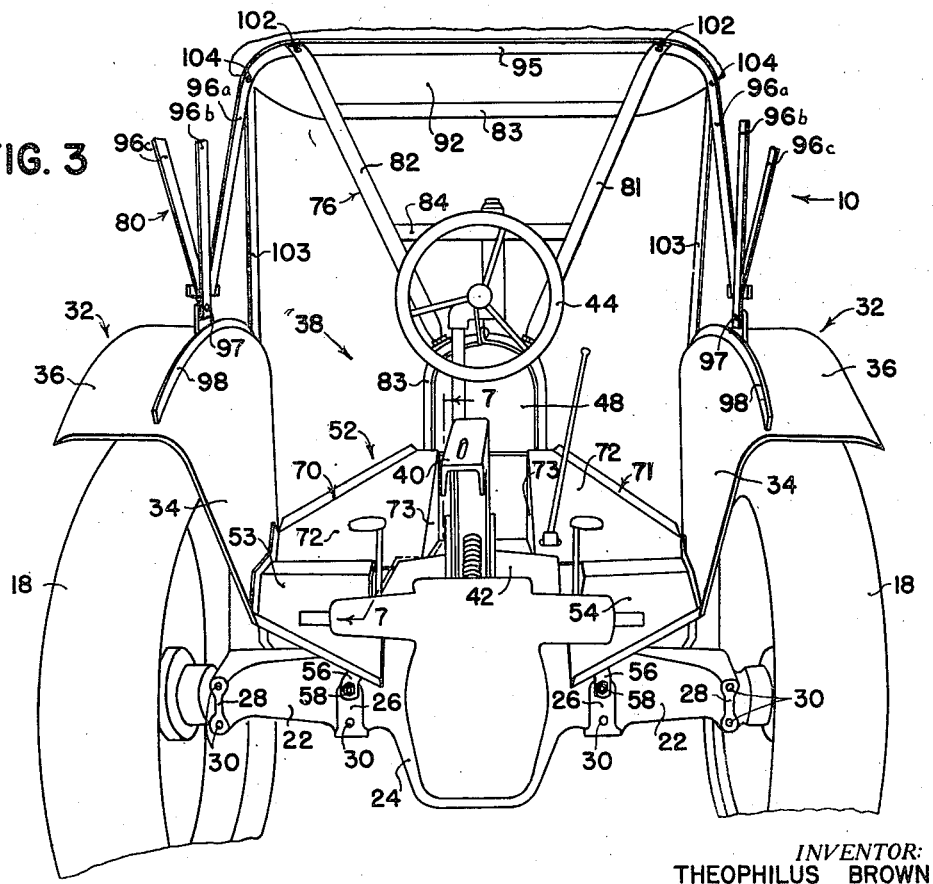
Figure 3 is a perspective rear view of the tractor and cab with the side curtains removed, the operator's seat being omitted so that certain details of the floor boards can be shown more clearly.

Mounted on the tractor body below the operator's seat are floor boards 52 (best shown in Figures 3 and 7) comprising a plurality of sheet metal sections formed to accommodate the irregularities of the tractor body as well as the several controls. Disposed on either side of the differential-transmission housing 24 are sections 53 and 54 having brackets 56 bolted to their rear edges and extending downwardly to engage the mounting bosses 26. A bolt 58 is passed through a hole in the bracket 56 and is threaded into the top hole 30 provided in the mounting boss 26. The sections 53, 54 are inclined upwardly and forwardly to clear brake drums 60 and have their front ends inclined downwardly for a short distance to engage transverse bracing members 62 to which they are fastened by bolts 64. The bracing members 62 are preferably made of angle iron and are fixed at their outer ends to brackets 66 on the fender side 34, the inner ends of the bracing members being fixed to any suitable portion of the transmission housing. A vertical flange 68 is provided around the laterally outer edges of the sections 53, 54, and these are bolted at 69 to the fenders 32. Front floor board sections 70 and 71 continue the floor board forwardly, and each of these sections has a forwardly and upwardly inclined surface 72 and a vertical face 73. The lower edge of the vertical face 73 rests upon a horizontal platform 74 formed by the top side of the engine crank case 47 (see Figure 1), while the front end of the inclined wall 72 engages under the rear end of the fuel tank 48 to hold the section firmly down against the platform 74. The rear end of the wall 72 overlaps the front end of its respective section 53, 54 and is secured to the brace 62 by the bolt 64. A transverse vertical section 75 closes the rectangular space between the fuel tank 48, platform 74, and vertical walls 73 of the front sections 70 and 71.

The cab 10 consists of an open or skeleton frame to which side curtains and a top are secured by snap fasteners. The cab frame comprises a rigidly braced front windshield frame 76 and a folding top frame 80, the latter being connected with the windshield frame in a manner to be described in more detail presently. The windshield frame 76 is made up of a pair of upwardly and rearwardly diverging side members 81 and 82 which are fixed at their lower ends to a bracket member 83 formed to embrace the rear end of the fuel tank 48 and secured thereto in any suitable manner. The side members 81, 82 are connected by vertically spaced cross members 83 and 84 which, together with the side members 81, 82, define a window opening adapted to receive a pane of glass 85. The windshield pane 85 is held in place on the frame 76 by means of a bead 86 made of resilient material, preferably rubber. The bead 86 is generally elliptical in cross section and has two grooves 90 and 91 formed in opposite sides thereof and extending the length of the bead. The groove 90 is adapted to receive the edge of the pane 85, and the groove 91 is adapted to receive the edge of the associated windshield frame member, as best shown in Figure 6. This form of connection forms a weather tight seal around the glass, and at the same time cushions the glass against vibration and shock. Fixed to the upper end of the windshield frame 76 is a visor 92 which is preferably made of sheet metal and is formed to the shape of the ribs supporting the top.

The top of the cab is indicated in its entirety by the reference numeral 93 and comprises the folding frame 80 covered with flexible material 94 such as water proofed canvas or the like to form a canopy over the operator. The frame 80 comprises a plurality of transversely extending bowed ribs 95 carried on downwardly extending side arms 96a, 96b, and 96c which are connected at their lower ends for folding together. The center arms 96b are pivoted at 97 on fore and aft extending mounting flanges 98 each of which is curved to fit the crown 36 of its respective fender 32 and is secured thereto in any suitable manner. A short cross bar 99 is fixed to each of the center arms just above the pivot 97, and the outer arms 96a and 96c are pivoted on these cross bars. Folding braces 100 and 101 connect arms 96a with 96b and 96b with 96c, respectively, at their upper ends to hold the top open, as shown in Figure 4, these braces folding together jack-knife style when the top is folded forwardly, as shown in Figure 5.

The front rib 95 is bolted at 102 to the upper ends of the windshield frame members 81, 82 and is rigidly held in fixed position at all times. Also bracing the front rib 95 are corner struts 103 which are fixed to the front ends of the mounting flanges 98 and extend upwardly therefrom to connect at 104 with the outer ends of the rib.

Figure 2:
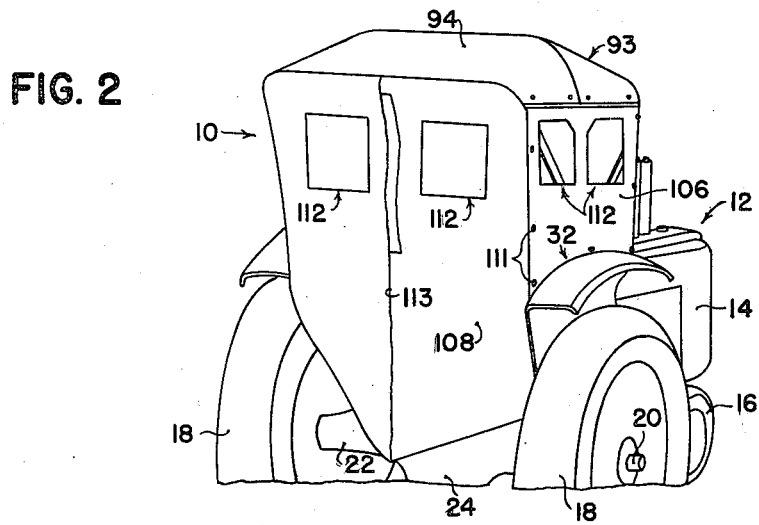
Figure 2 is a perspective rear view of the same drawn to a reduced scale.

When protection from all sides is required, side curtains 106, with front and rear curtains 107, 108, may be used, and these curtains are secured to the frame by the usual snap fasteners 111. The front and rear curtains 107, 108 extend from the floor boards 52 to the canopy top 93, while the side curtains 105, 106 extend from the fenders 32 to the top 93. The front curtain 107 extends across the front of the windshield frame 76 below the windshield pane 85, closing the space between the bracket 83 and the window frame member 84. Windows 112 are provided in each of the curtains to afford wide visibility in all directions. The rear curtain 108 is divided down the middle, as at 113 (Figure 2) to allow the operator to enter and leave the cab and also to permit him to reach out of the cab rearwardly to operate control levers and the like on implements attached to the rear of the tractor.

When it is desired to close the top so as to allow the operator to stand erect at his station, the arms 96b and 96c are folded forwardly against arm 96a and the ribs 95 rest on top of the windshield frame, as shown in Figure 5. Thus the folded top is held up above the line of vision of the operator while seated, and at the same time is positioned to be below the line of vision while the operator is standing.

It is believed that the advantages of our invention will be apparent from the foregoing description, and what we claim and desire to secure by Letters Patent is:

1. For use with a tractor having a fore and aft extending fuel tank and a pair of laterally spaced fenders, a cab comprising a bracket member mounted on the rear end of said fuel tank and fixedly secured thereto, a windshield frame comprising a pair of laterally spaced members fixed to said bracket and extending upwardly therefrom in diverging relation, a windshield disposed between and carried by said members, and a collapsible top comprising a plurality of transverse ribs having downwardly extending arms pivotally mounted on said fenders to fold forwardly against the top of said windshield frame.

2. For use with a tractor having a fore and aft extending fuel tank and a pair of wheel fenders spaced rearwardly from the rear end thereof, a cab comprising a bracket member shaped to embrace the rear end of the fuel tank and fixedly secured thereto, a windshield frame fixed to and extending upwardly and rearwardly from said bracket member, a plurality of transverse ribs having downwardly extending arms pivoted on said fenders at a point spaced appreciably rearward of said bracket member, said ribs being adapted to fold forwardly to lie against the top of said windshield frame, and a pair of bracing members fixed to said fenders substantially midway between said bracket member and the points of connection of said arms with said fenders, said bracing members being fixed to the upper ends of said windshield frame.

THEOPHILUS BROWN.
TALBERT W. PAUL.